United States Patent
Suzuki et al.

(10) Patent No.: US 9,950,629 B2
(45) Date of Patent: Apr. 24, 2018

(54) VEHICLE POWER SOURCE

(71) Applicant: SUBARU CORPORATION, Tokyo (JP)

(72) Inventors: Hiroshi Suzuki, Tokyo (JP); Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 118 days.

(21) Appl. No.: 15/066,834

(22) Filed: Mar. 10, 2016

(65) Prior Publication Data

US 2016/0288652 A1    Oct. 6, 2016

(30) Foreign Application Priority Data

Mar. 31, 2015 (JP) ................. 2015-073433

(51) Int. Cl.
*H02J 7/00* (2006.01)
*B60L 11/12* (2006.01)
(Continued)

(52) U.S. Cl.
CPC .......... *B60L 11/12* (2013.01); *F02N 11/0866* (2013.01); *F02N 11/006* (2013.01);
(Continued)

(58) Field of Classification Search
CPC ........ B60L 11/12; F02N 11/006; F02N 11/04; F02N 11/0814; F02N 11/0866; F02N 11/087; F02N 15/08; F02N 2200/061
See application file for complete search history.

(56) References Cited

U.S. PATENT DOCUMENTS

2004/0053083 A1    3/2004 Kobayashi et al.
2008/0060601 A1    3/2008 Lecole et al.
(Continued)

FOREIGN PATENT DOCUMENTS

CN    1495065 A    5/2004
JP    2002-021687 A    1/2002
(Continued)

OTHER PUBLICATIONS

Decision to Grant issued in corresponding Japanese Patent Application No. 2015-073433, dated Dec. 27, 2016.
(Continued)

*Primary Examiner* — Vuthe Siek
(74) *Attorney, Agent, or Firm* — McDermott Will & Emery LLP

(57) ABSTRACT

A vehicle power source includes: a generator coupled to an engine; a first power storage coupled to the generator; a second power storage coupled, in parallel with the first storage, to the generator, in which a terminal voltage of the second power storage is lower than a terminal voltage of the first power storage; and a charge and discharge controller that controls a generated voltage of the generator and controls charge and discharge of the first power storage. The charge and discharge controller raises the generated voltage to a voltage higher than the terminal voltage of the first power storage, to cause power supply from the generator to the first power storage. The charge and discharge controller lowers the generated voltage to a voltage lower than the terminal voltage of the first power storage, to cause power supply from the first power storage to an electric load.

10 Claims, 10 Drawing Sheets

(51) Int. Cl.
*F02N 11/08* (2006.01)
*F02N 11/00* (2006.01)
*F02N 11/04* (2006.01)
*F02N 15/08* (2006.01)

(52) U.S. Cl.
CPC ............ *F02N 11/04* (2013.01); *F02N 11/087* (2013.01); *F02N 11/0814* (2013.01); *F02N 15/08* (2013.01); *F02N 2200/061* (2013.01)

(56) References Cited

U.S. PATENT DOCUMENTS

| | | | |
|---|---|---|---|
| 2010/0263640 A1 | 10/2010 | Armiroli | |
| 2011/0001352 A1* | 1/2011 | Tamura | B60R 16/033 307/9.1 |
| 2015/0352968 A1* | 12/2015 | Date | B60L 3/0046 307/10.1 |

FOREIGN PATENT DOCUMENTS

| | | |
|---|---|---|
| JP | 2008-513295 A | 5/2008 |
| JP | 2011-504080 A | 1/2011 |
| JP | 2011-176958 A | 9/2011 |
| JP | 2011-178384 A | 9/2011 |
| JP | 2011-230618 A | 11/2011 |
| JP | 2014-036557 A | 2/2014 |

OTHER PUBLICATIONS

Notification of Reasons for Refusal Japanese Patent Application No. 2015-073433 dated Jun. 21, 2016 with English translation.
Chinese Second Office Action in Chinese Application No. 201610176823.9 dated Dec. 29, 2017 (English translation).

* cited by examiner

VEHICLE POWER SOURCE

CROSS-REFERENCE TO RELATED APPLICATIONS

The present application claims priority from Japanese Patent Application No. 2015-073433 filed on Mar. 31, 2015, the entire contents of which are hereby incorporated by reference.

BACKGROUND

The technology relates to a vehicle power source that may be mounted on a vehicle.

As a vehicle power source that may be mounted on a vehicle, a power source has been developed that includes a plurality of power storages. As such power storages that constitute the power source, lead batteries, lithium ion batteries, and other batteries have been used (refer to Japanese Unexamined Patent Application Publication (JP-A) No. 2014-36557). In a power source described in JP-A No. 2014-36557, regenerative electric power may be recovered in vehicle deceleration; and the regenerative electric power thus recovered may be charged not only in a lead battery but also in a lithium ion battery. This makes it possible to regenerate much electric power in the deceleration of a vehicle, leading to enhancement in energy efficiency of the vehicle.

However, in the power source described in JP-A No. 2014-36557, a terminal voltage of the lithium ion battery is set lower than a terminal voltage of a lead battery. Accordingly, in order to positively allow for charge and discharge of the lithium ion battery described in JP-A No. 2014-36557, it has been desirable to provide a dedicated discharge circuit on the lithium ion battery side, or to incorporate a converter in the power source. Moreover, at the time of restart, it has been desirable to couple an instantaneous voltage drop protection load to the dedicated discharge circuit, allowing for protection of the instantaneous voltage drop protection load. Such complication of a control method and a circuit structure of the power source has been one factor that may incur increasing costs of a vehicle power source.

SUMMARY

It is desirable to attain reduction in costs of a vehicle power source that includes a first power storage and a second power storage.

An aspect of the technology provides a vehicle power source mounted on a vehicle, the vehicle power source including: a generator coupled to an engine; a first power storage coupled to the generator; a second power storage coupled, in parallel with the first storage, to the generator, in which a terminal voltage of the second power storage is lower than a terminal voltage of the first power storage; and a charge and discharge controller that controls a generated voltage of the generator and controls charge and discharge of the first power storage. The charge and discharge controller raises the generated voltage to a voltage higher than the terminal voltage of the first power storage, to cause power supply from the generator to the first power storage. The charge and discharge controller lowers the generated voltage to a voltage lower than the terminal voltage of the first power storage, to cause power supply from the first power storage to an electric load.

DETAILED DESCRIPTION

Figure 1:
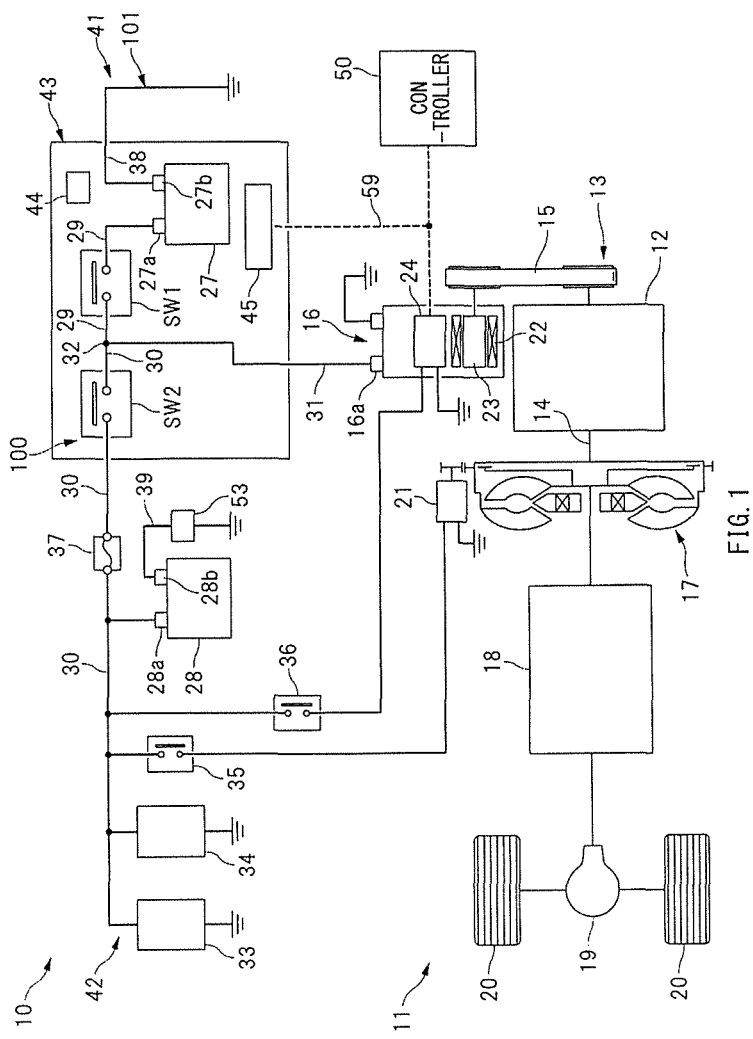
FIG. 1 schematically illustrates a configuration example of a vehicle including a vehicle power source according to an implementation of the technology.

In the following, some implementations of the technology are described in detail with reference to the drawings. FIG. 1 schematically illustrates a configuration example of a vehicle 11 including a vehicle power source 10 according to an implementation of the technology. Referring to FIG. 1, the vehicle 11 may include a power unit 13 having an engine 12. The engine 12 may include a crank shaft 14 to which a motor generator 16 may be coupled through a belt mechanism 15. Thus, the motor generator 16 is mechanically coupled to the engine 12. In one implementation of the technology, the motor generator 16 may serve as a "generator" and a "starter". A transmission mechanism 18 may be also coupled to the engine 12 through a torque converter 17. One or more wheels 20 may be coupled to the transmission mechanism 18 through a differential mechanism 19 or other parts. The power unit 13 may further include a starter motor 21 that causes starting revolution of the crank shaft 14.

The motor generator 16 may be a so-called ISG (integrated starter generator). Not only may the motor generator 16 serve as a generator that is driven by the crank shaft 14 to generate power, the motor generator 16 may also serve as an electric motor that causes the starting revolution of the crank shaft 14. The motor generator 16 may include a stator 22 and a rotor 23; the stator 22 may include a stator coil, and the rotor 23 may include a field coil. The motor generator 16 may further include an ISG controller 24, in order to control energized states of the stator coil and the field coil. The ISG controller 24 may include an inverter, a regulator, a microcomputer, and other parts.

In allowing the motor generator 16 to serve as a generator, the energized state of the field coil may be controlled by the ISG controller 24. Controlling the energized state of the field coil makes it possible to control a generated voltage of the motor generator 16. Also, in allowing the motor generator 16 to serve as a generator, controlling the inverter of the ISG controller 24 makes it possible to control a generated current of the motor generator 16. Furthermore, in allowing the motor generator 16 to serve as an electric motor, the energized state of the stator coil may be controlled by the ISG controller 24.

Figure 2:
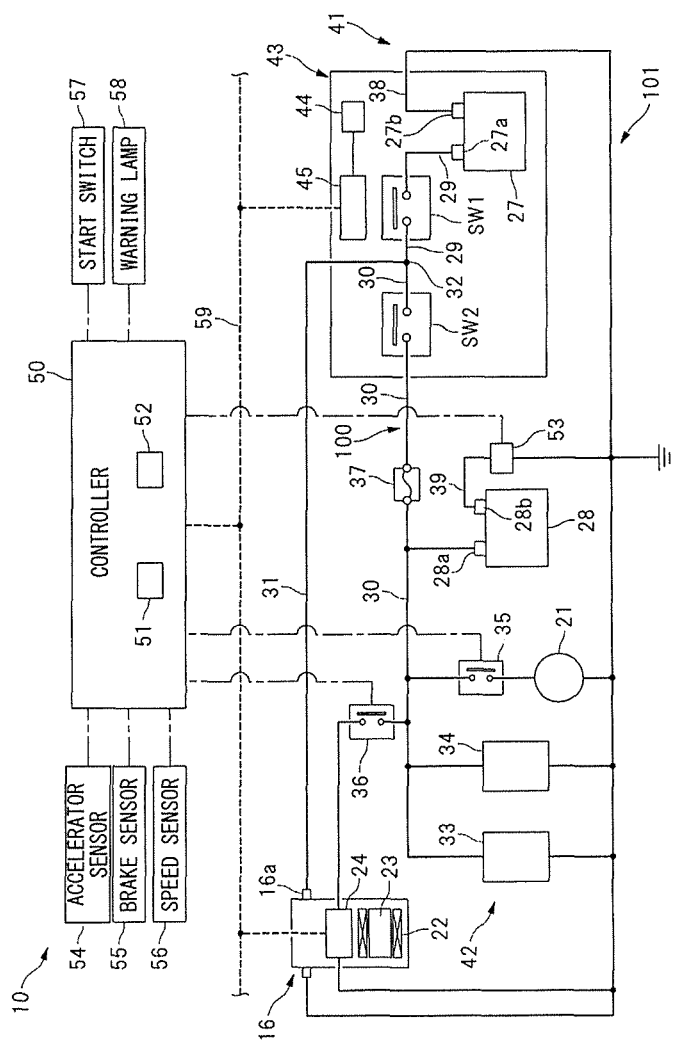
FIG. 2 is a block diagram of a configuration example of the vehicle power source.
Figure 3:
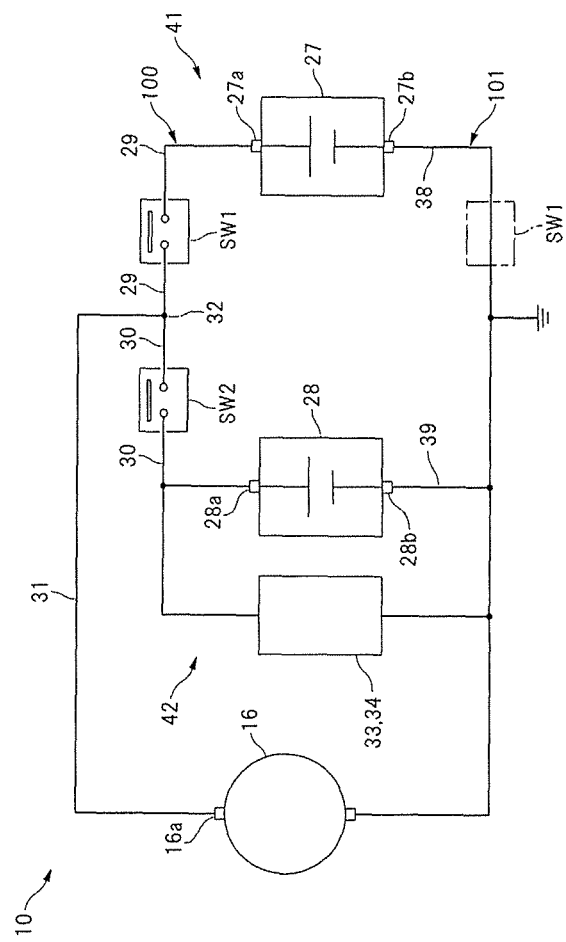
FIG. 3 is a simplified circuit diagram of a configuration of the vehicle power source.

Description is given next of a configuration of the vehicle power source 10. FIG. 2 is a block diagram of a configuration example of the vehicle power source 10. FIG. 3 is a simplified circuit diagram of a configuration of the vehicle power source 10. Referring to FIGS. 1 to 3, the vehicle power source 10 includes a lithium ion battery 27 and a lead battery 28. In one implementation of the technology, the lithium ion battery 27 may serve as a "first power storage", and the lead battery 28 may serve as a "second power storage". The lithium ion battery 27 is coupled to the motor generator 16. The lead battery 28 is coupled, in parallel with the lithium ion battery 27, to the motor generator 16. A first power line 29 may be coupled to a positive electrode terminal 27a of the lithium ion battery 27. A second power line 30 may be coupled to a positive electrode terminal 28a of the lead battery 28. Moreover, the motor generator 16 may include an output terminal 16a that outputs the generated current of the motor generator 16. A conduction line 31 may be coupled to the output terminal 16a. The first power line 29, the second power line 30, and the conduction line 31 may be coupled to one another through a node 32 that may serve as a connection point. In other words, the first power line 29, the second power line 30, and the node 32 may constitute a conduction path 100; the positive electrode terminals 27a and 28a of the lithium ion battery 27 and the lead battery 28 may be coupled to each other through the conduction path 100.

The first power line 29 that constitutes the conduction path 100 may be provided with an ON/OFF switch SW1. The second power line 30 that constitutes the conduction path 100 may be provided with an ON/OFF switch SW2. Note that the ON/OFF switch SW2 may be inserted between the positive electrode terminal 28a and the node 32 in the second power line 30. The ON/OFF switches SW1 and SW2 each may operate in a closed state or a conductive state (i.e., an ON state) and in an open state or a cut-off state (i.e., an OFF state). In other words, the ON/OFF switch SW1 may be switched between the conductive state and the cut-off state; the conductive state may involve electrical coupling of the motor generator 16 to the lithium ion battery 27; and the cut-off state may involve electrical separation of the motor generator 16 from the lithium ion battery 27. Similarly, the ON/OFF switch SW2 may be switched between the conductive state and the cut-off state; the conductive state may involve electrical coupling of the motor generator 16 to the lead battery 28; and the cut-off state may involve electrical separation of the motor generator 16 from the lead battery 28.

To the second power line 30, loads such as, but not limited to, an instantaneous voltage drop protection load 33 and a vehicle body load 34 may be coupled. In one implementation of the technology, the instantaneous voltage drop protection load 33 may serve as an "electric load". Also, the starter motor 21 may be coupled to the second power line 30 through a starter relay 35, and the ISG controller 24 may be coupled to the second power line 30 through an ISG relay 36. Furthermore, the second power line 30 may be provided with a fuse 37 that protects the instantaneous voltage drop protection load 33, the vehicle body load 34, the starter motor 21, the ISG controller 24, and other loads or components. Note that, in the illustrated example, the ON/OFF switch SW1 may be inserted in the first power line 29, but this is non-limiting. As indicated by a dashed line in FIG. 3, the ON/OFF switch SW1 may be inserted in a conduction line 38 coupled to a negative electrode terminal 27b of the lithium ion battery 27. In other words, the conduction line 38 and a conduction line 39 may constitute a conduction path 101; the negative electrode terminal 27b of the lithium ion battery 27 and a negative electrode terminal 28b of the lead battery 28 may be coupled to each other through the conduction path 101. The ON/OFF switch SW1 may be inserted in the conduction line 38 that forms the conduction path 101.

As illustrated in FIGS. 1 and 2, the vehicle power source 10 may include a first power circuit 41 that includes the lithium ion battery 27 and the motor generator 16. The vehicle power source 10 may also include a second power circuit 42 that includes components such as, but not limited to, the lead battery 28, the instantaneous voltage drop protection load 33, the vehicle body load 34, and the starter motor 21. The first power circuit 41 and the second power circuit 42 may be coupled to each other through the ON/OFF switch SW2. In one implementation of the technology, the ON/OFF switch SW2 may serve as a "switch". Note that the ON/OFF switch SW1 provided in the first power circuit 41 may be a switch that electrically separates the lithium ion battery 27 from the vehicle power source 10. Furthermore, the vehicle power source 10 may include a battery module 43. In the battery module 43, the lithium ion battery 27 and the ON/OFF switches SW1 and SW2 may be incorporated.

The battery module 43 may include a battery sensor 44 that detects a current, a voltage, temperature, and other characteristics of the lithium ion battery 27. Moreover, the battery module 43 may include a battery controller 45, in order to control operation states of the ON/OFF switches SW1 and SW2. The battery controller 45 may include, for example, a drive circuit and a microcomputer. The battery controller 45 may control the ON/OFF switches SW1 and SW2, based on control signals from a control unit 50, as described later. Also, the battery controller 45 may open the ON/OFF switch SW1 to separate the lithium ion battery 27 from the vehicle power source 10, when excessive charge and discharge currents or an increase in temperature of the lithium ion battery 27 is detected. Note that, though not illustrated, the battery controller 45 may be coupled to the second power line 30, similarly to the ISG controller 24 as mentioned above.

As mentioned above, the instantaneous voltage drop protection load 33 may be coupled to the second power line 30. In one implementation of the technology, the instantaneous voltage drop protection load 33 may serve as an "electrical appliance" that ought to be kept in operation during engine restart in idling stop control, as described later. Non-limiting examples of the instantaneous voltage drop protection load 33 may include engine auxiliaries, a brake actuator, a power steering actuator, an instrumental panel, and various electronic control units. Also, the vehicle body load 34 may be coupled to the second power line 30. The vehicle body load 34 is an electrical appliance whose instantaneous shut-down is allowable during the engine restart in the idling stop control. Non-limiting examples of the vehicle body load 34 may include a door mirror motor, a power window motor, and a radiator fan motor.

As illustrated in FIG. 2, the vehicle power source 10 includes a control unit 50 that controls the motor generator 16, the battery module 43, and other parts. The control unit 50 includes a charge and discharge controller 51 that controls charge and discharge of the lithium ion battery 27. In one implementation of the technology, the charge and discharge controller 51 may serve as a "charge and discharge controller". The charge and discharge controller 51 may determine, based on input signals from other controllers or sensors, a state of charge of the lithium ion battery 27, and operation states of an accelerator pedal and a brake pedal. Based on the state of charge of the lithium ion battery 27, and other states, the charge and discharge controller 51 controls the generated voltage of the motor generator 16 and controls charge and discharge of the lithium ion battery 27.

The control unit 50 may include an ISS controller 52 that controls stop and restart of the engine 12. In one implementation of the technology, the ISS controller 52 may serve as an "engine controller". The ISS controller 52 may determine, based on input signals from other controllers or sensors, a stop condition and a start condition of the engine 12. The ISS controller 52 may automatically stop the engine 12 when the stop condition is established, and may automatically restart the engine 12 when the start condition is established. A non-limiting example of the stop condition of the engine 12 may be that a vehicle speed is equal to or lower than a predetermined vehicle speed and the brake pedal is stepped down. Non-limiting examples of the start condition of the engine 12 may include that stepping down of the brake pedal is released, and that the accelerator pedal is stepped down. Note that the term "ISS" for the ISS controller 52 is an abbreviation of "idling stop system".

The control unit 50 may be coupled to sensors such as, but not limited to, a battery sensor 53, an accelerator sensor 54, and a brake sensor 55. The battery sensor 53 detects charge and discharge currents, a state of charge, and other characteristics of the lead battery 28. The accelerator sensor 54 detects an amount of stepping down of the accelerator pedal. The brake sensor 55 detects an amount of stepping down of the brake pedal. The control unit 50 may be also coupled to other sensors such as, but not limited to, a vehicle speed sensor 56 and a start switch 57. The vehicle speed sensor 56 detects a vehicle speed, i.e. a traveling speed of the vehicle 11. The start switch 57 is manually operated by an occupant in engine start. The control unit 50 may receive, from the ISG controller 24, the generated voltage, the generated current, regeneration torque, drive torque, and other characteristics of the motor generator 16. Similarly, the control unit 50 may receive, from the battery controller 45, the charge and discharge currents, and the state of charge of the lithium ion battery 27, and the operation states of the ON/OFF switches SW1 and SW2. Furthermore, a warning lamp 58 may be coupled to the control unit 50. The warning lamp 59 informs an occupant of abnormality of the vehicle power source 10.

Note that the control unit 50 may include, for example, a microcomputer and a drive circuit. The microcomputer may include a CPU, ROM, RAM, and other components. The drive circuit may generate control currents of various actuators. The control unit 50, the motor generator 16, the battery module 43, and other parts may be coupled to one another through an on-vehicle network 59 such as, but not limited to, CAN and LIN.

[Voltage Characteristics of Batteries]

Figure 4:
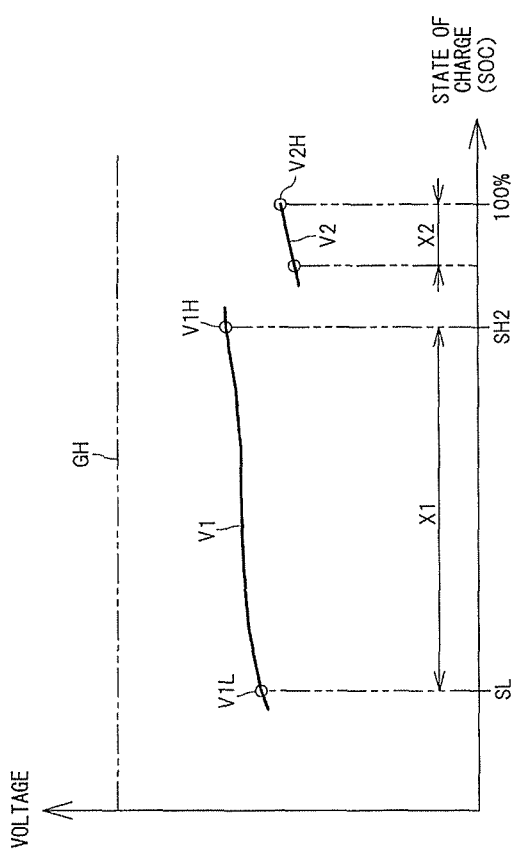
FIG. 4 is a diagram of relations between terminal voltages and states of charge in batteries.

Description is given next of voltage characteristics of the lithium ion battery 27 and the lead battery 28. FIG. 4 is a diagram of relations between terminal voltages and the states of charge SOC in the batteries. Note that a state of charge SOC is a value that indicates a degree of charge of a battery, or a ratio of remaining capacity to design capacity of a battery. In FIG. 4, terminal voltages V1 and V2 indicate battery voltages with no current flowing therethrough, i.e., an open end voltage. Also, in FIG. 4, a reference GH indicates a maximum generated voltage of the motor generator 16.

Referring to FIG. 4, the terminal voltage V1 of the lithium ion battery 27 is set higher than the terminal voltage V2 of the lead battery 28. In other words, a lower limit voltage V1L of a charge and discharge range X1 of the lithium ion battery 27 may be set higher than an upper limit voltage V2H of a charge and discharge range X2 of the lead battery 28. Moreover, the terminal voltage V1 of the lithium ion battery 27 may be set lower than an upper limit (e.g., 16 V) of a charge voltage of the lead battery 28. In other words, an upper limit voltage V1H of the charge and discharge range X1 of the lithium ion battery 27 may be set lower than the upper limit of the charge voltage of the lead battery 28. This makes it possible to avoid excessive charge of the lead battery 28 by the lithium ion battery 27 even in a case of parallel connection of the lithium ion battery 27 and the lead battery 28, and to avoid deterioration of the lead battery 28. Note that an upper limit of a charge voltage is an upper limit value of a charge voltage, specified for each type of power storage in view of suppression of deterioration of a power storage.

As illustrated in FIG. 4, the lithium ion battery 27 may be provided with the broad charge and discharge range X1, owing to good cycle characteristics of the lithium ion battery 27. In contrast, the lead battery 28 may be provided with the narrow charge and discharge range X2 near full charge, in view of prevention of battery deterioration. Moreover, internal resistance of the lithium ion battery 27 may be set lower than internal resistance of the lead battery 28.

[Power Generation Control of Motor Generator]

Figure 5:
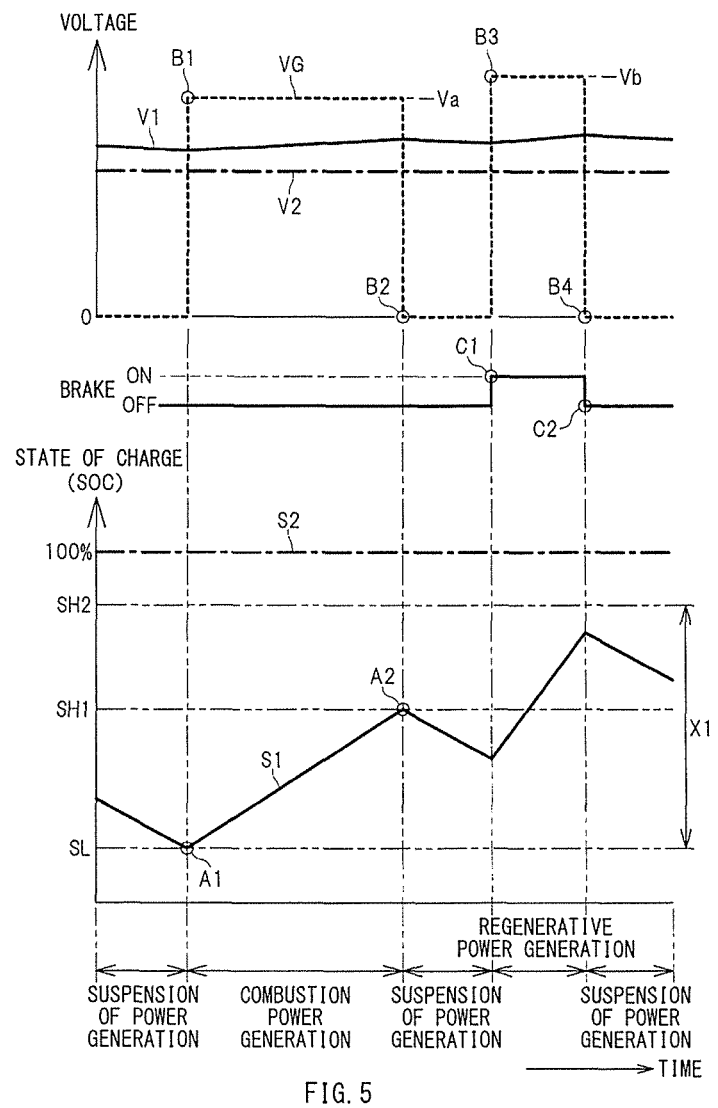
FIG. 5 is a time chart of an example of power generation control of a motor generator.

Description is given next of power generation control of the motor generator 16. FIG. 5 is a time chart of an example of the power generation control of the motor generator 16. FIG. 5 indicates the generated voltage VG of the motor generator 16, the terminal voltage V1 and the state of charge S1 of the lithium ion battery 27, and the terminal voltage V2 and the state of charge S2 of the lead battery 28. In FIG. 5, "brake ON" means that the brake pedal is stepped down, and "brake OFF" means that the stepping down of the brake pedal is released.

Referring to FIG. 5, the state of charge S1 of the lithium ion battery 27 may be controlled within the charge and discharge range X1. For example, when the state of charge S1 of the lithium ion battery 27 is lowered to a lower limit SL in accordance with discharge, the motor generator 16 may be controlled to a power generation state, allowing the lithium ion battery 27 to be charged. Here, the power generation state of the motor generator 16 may include a combustion power generation state and a regenerative power generation state. The combustion power generation state may involve allowing the motor generator 16 to generate power with use of power of the engine 12, and converting fuel energy to electric energy. The regenerative power generation state may involve allowing the motor generator 16 to generate power in vehicle deceleration, and converting kinetic energy of the vehicle 11 to electric energy. To improve energy efficiency of the vehicle 11 to enhance fuel consumption performance, it is desirable to facilitate the regenerative power generation state of the motor generator 16 while restraining the combustion power generation state of the motor generator 16, allowing suppression of an amount of fuel consumption of the engine 12. In other words, it is desirable to allow the lithium ion battery 27 to positively store regenerative electric power of the motor generator 16, and to discharge the regenerative electric power from the lithium ion battery 27 to the vehicle body load 34 or other parts, restraining the combustion power generation state of the motor generator 16.

Whether to control the motor generator 16 to the combustion power generation state or not may be determined based on the state of charge S1 of the lithium ion battery 27. Specifically, the charge and discharge controller 51 may control the motor generator 16 to the combustion power generation state when the state of charge S1 is lowered to the lower limit SL. Then, the charge and discharge controller 51 may keep the combustion power generation state of the motor generator 16 until the state of charge S1 reaches a first upper limit SH1. Whether to control the motor generator 16 to the regenerative power generation state or not may be determined based on the operation states of the accelerator pedal and the brake pedal. Specifically, the charge and discharge controller 51 may control the motor generator 16 to the regenerative power generation state, in the vehicle deceleration when the stepping down of the accelerator pedal is released, or in the vehicle deceleration when the brake pedal is stepped down. Then, the charge and discharge controller 51 may cancel the regenerative power generation state of the motor generator 16 in a case of the stepping down of the accelerator pedal, or in a case of the release of the stepping down of the brake pedal, and may control the motor generator 16 to a power generation suspension state. Note that, with the motor generator 16 controlled in the regenerative power generation state, when the state of charge S1 increases to a second upper limit SH2, the regenerative power generation state of the motor generator 16 may be cancelled in order to prevent excessive charge of the lithium ion battery 27; and the motor generator 16 may be controlled to the power generation suspension state.

[Power Supply States of Vehicle Power Source]

Figure 6:
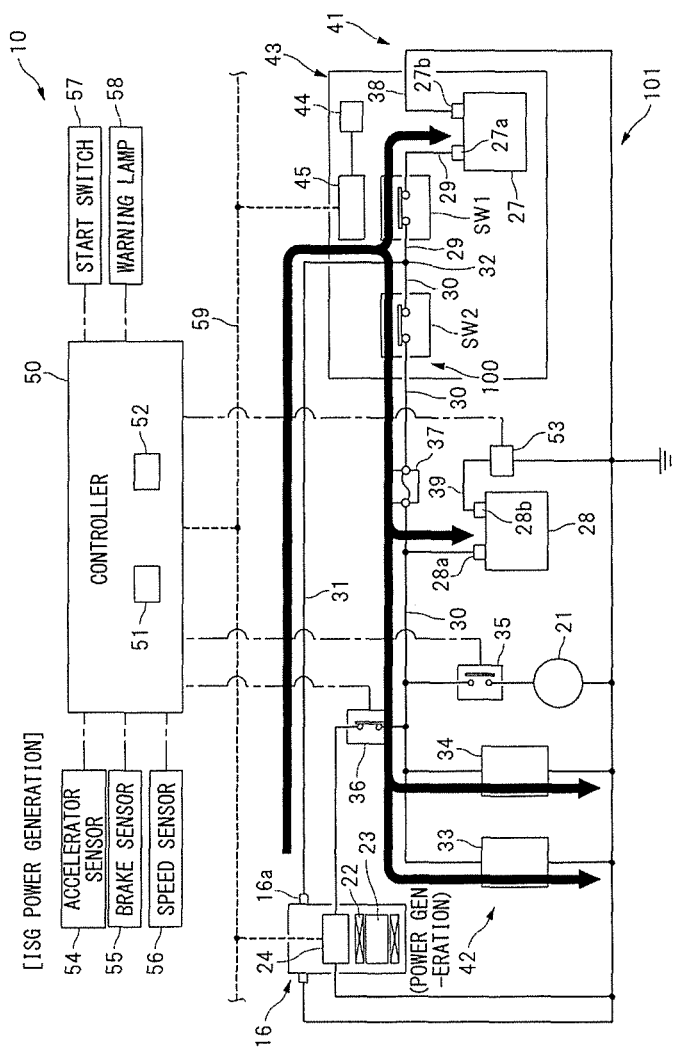
FIG. 6 illustrates a state of power supply of the vehicle power source.
Figure 7:
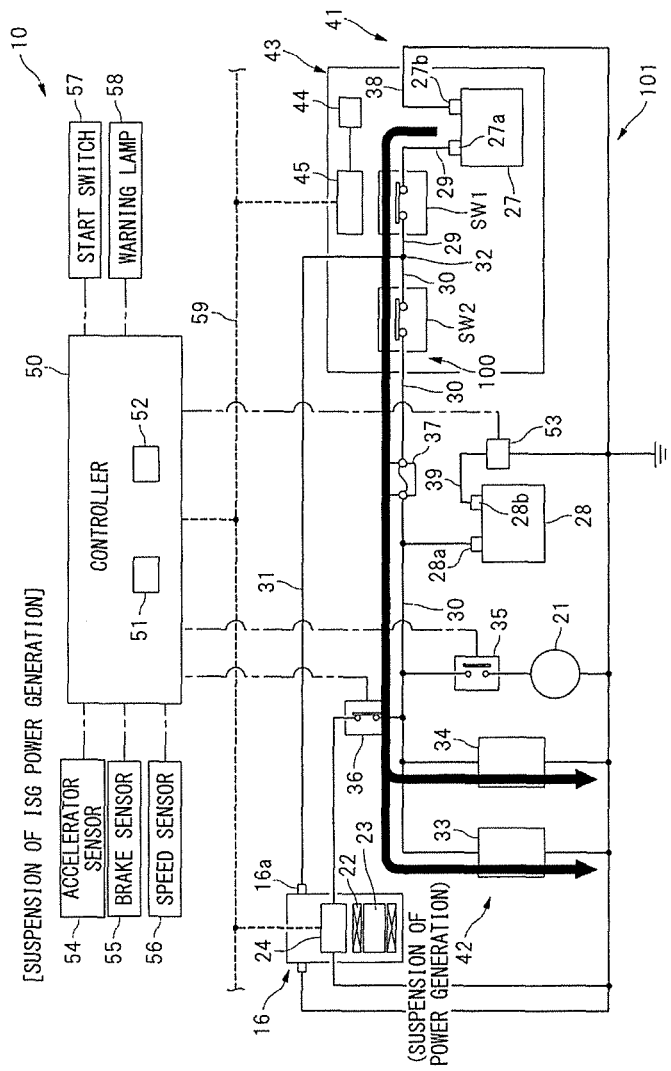
FIG. 7 illustrates a state of power supply of the vehicle power source.

Description is now given of power supply states of the vehicle power source 10. FIGS. 6 and 7 illustrate the power supply states of the vehicle power source 10. FIG. 6 illustrates the power supply state in charging the lithium ion battery. FIG. 7 illustrates the power supply state in discharging the lithium ion battery.

First, as illustrated in FIG. 5, when the state of charge S1 of the lithium ion battery 27 is lowered to the lower limit SL (as denoted by a reference A1), the charge and discharge controller 51 may control the motor generator 16 to the combustion power generation state. In the combustion power generation state, the generated voltage VG of the motor generator 16 is raised to a predetermined voltage Va higher than the terminal voltage V1 of the lithium ion battery 27 (as denoted by a reference B1). Here, referring to FIG. 6, in raising the generated voltage VG of the motor generator 16 above the terminal voltage V1 of the lithium ion battery 27, the ON/OFF switches SW1 and SW2 in the battery module 43 may be kept in the closed state. Thus, as denoted by an arrow in FIG. 6, the generated power of the motor generator 16 is supplied to the lithium ion battery 27, the lead battery 28, the instantaneous voltage drop protection load 33, and the vehicle body load 34.

Controlling the motor generator 16 to the combustion power generation state as described may cause the lithium ion battery 27 to be charged, allowing the state of charge S1 of the lithium ion battery 27 to increase gradually. As illustrated in FIG. 5, when the state of charge S1 reaches the first upper limit SH1 (as denoted by a reference A2), the charge and discharge controller 51 may control the motor generator 16 to the power generation suspension state. In the power generation suspension state, the generated voltage VG of the motor generator 16 is lowered to "zero" lower than the terminal voltage V1 of the lithium ion battery 27 (as denoted by a reference B2). Here, referring to FIG. 7, in lowering the generated voltage VG of the motor generator 16 below the terminal voltage V1 of the lithium ion battery 27, the ON/OFF switches SW1 and SW2 in the battery module 43 may be kept in the closed state. Thus, as denoted by an arrow in FIG. 7, the electric power stored in the lithium ion battery 27 is supplied to the instantaneous voltage drop protection load 33 and the vehicle body load 34, and discharge of the lead battery 28 may be suppressed. Basically, the electric power stored in the lead battery 28 may also be supplied to the instantaneous voltage drop protection load 33 and the vehicle body load 34. When the state of charge of the lead battery 28 is lowered, the electric power stored in the lithium ion battery 27 may be supplied also to the lead battery 28.

Next, as illustrated in FIG. 5, when the brake pedal is stepped down (as denoted by a reference C1), the charge and discharge controller 51 may control the motor generator 16 to the regenerative power generation state. In the regenerative power generation state, the generated voltage VG of the motor generator 16 is raised to a predetermined voltage Vb higher than the terminal voltage V1 of the lithium ion battery 27 (as denoted by a reference B3). Here, as illustrated in FIG. 6, in raising the generated voltage VG of the motor generator 16 above the terminal voltage V1 of the lithium ion battery 27, the ON/OFF switches SW1 and SW2 in the battery module 43 may be kept in the closed state. Thus, as denoted by an arrow in FIG. 6, the generated power of the motor generator 16 is supplied to the lithium ion battery 27, the lead battery 28, the instantaneous voltage drop protection load 33, and the vehicle body load 34.

Thereafter, as illustrated in FIG. 5, when the stepping down of the brake pedal is released (as denoted by a reference C2), the charge and discharge controller 51 may control the motor generator 16 to the power generation suspension state. In the power generation suspension state, the generated voltage VG of the motor generator 16 is lowered to "zero" lower than the terminal voltage V1 of the lithium ion battery 27 (as denoted by a reference B4). Here, as illustrated in FIG. 7, in lowering the generated voltage VG of the motor generator 16 below the terminal voltage V1 of the lithium ion battery 27, the ON/OFF switches SW1 and SW2 in the battery module 43 may be kept in the closed state. Thus, as denoted by an arrow in FIG. 7, the electric power stored in the lithium ion battery 27 is supplied to the instantaneous voltage drop protection load 33 and the vehicle body load 34. When the state of charge of the lead battery 28 is lowered, the electric power stored in the lithium ion battery 27 may be supplied also to the lead battery 28.

As described so far, controlling the generated voltage VG of the motor generator 16 makes it possible to control charge and discharge of the lithium ion battery 27. Specifically, raising the generated voltage VG above the terminal voltage V1 allows the lithium ion battery 27 to be charged, while lowering the generated voltage VG below the terminal voltage V1 allows the lithium ion battery 27 to discharge. Moreover, the terminal voltage V1 of the lithium ion battery 27 is set higher than the terminal voltage V2 of the lead battery 28. This makes it possible to allow for charge and discharge of the lithium ion battery 27 with the ON/OFF switches SW1 and SW2 kept in the closed state. In other words, it is possible to allow the lithium ion battery 27 to discharge without electrically separating the lead battery 28 from the lithium ion battery 27, positively allowing for charge and discharge of the lithium ion battery 27 without complicating a circuit structure and switch control of the vehicle power source 10. Hence, it is possible to enhance energy efficiency of the vehicle 11 and to reduce costs of the vehicle power source 10.

As illustrated in FIG. 6, in allowing the motor generator 16 to generate power, it is possible to positively charge the lithium ion battery 27, while suppressing charge of the lead battery 28. Specifically, since the internal resistance of the lithium ion battery 27 is smaller than the internal resistance of the lead battery 28, it is possible to positively charge the lithium ion battery 27 while suppressing charge of the lead battery 28. Moreover, as illustrated in FIG. 7, in allowing the motor generator 16 to suspend power generation, it is possible to positively allow the lithium ion battery 27 to discharge, while suppressing discharge of the lead battery 28. Specifically, since the terminal voltage V1 of the lithium ion battery 27 is higher than the terminal voltage V2 of the lead battery 28, it is possible to positively allow the lithium ion battery 27 to discharge, while suppressing discharge of the lead battery 28. Such suppression of charge and discharge of the lead battery 28 makes it possible to relieve requests for output characteristics and cycle characteristics of the lead battery 28, leading to reduction in costs of the lead battery 28. From this viewpoint as well, it is possible to reduce costs of the vehicle power source 10.

Note that, in the forgoing description, in lowering the generated voltage VG below the terminal voltage V1, the motor generator 16 may be controlled to the power generation suppression state. However, this is non-limiting. It is possible to allow the lithium ion battery 27 to discharge even when the generated voltage VG is lowered below the terminal voltage V1 while maintaining the power generation state of the motor generator 16. At this occasion, adjusting the generated current of the motor generator 16 may allow for control of the discharge current of the lithium ion battery 27. Specifically, increasing the generated current of the motor generator 16 may allow for a decrease in the discharge current of the lithium ion battery 27, while decreasing the generated current of the motor generator 16 may allow for an increase in the discharge current of the lithium ion battery 27.

[Engine Start Control]

Figure 8:
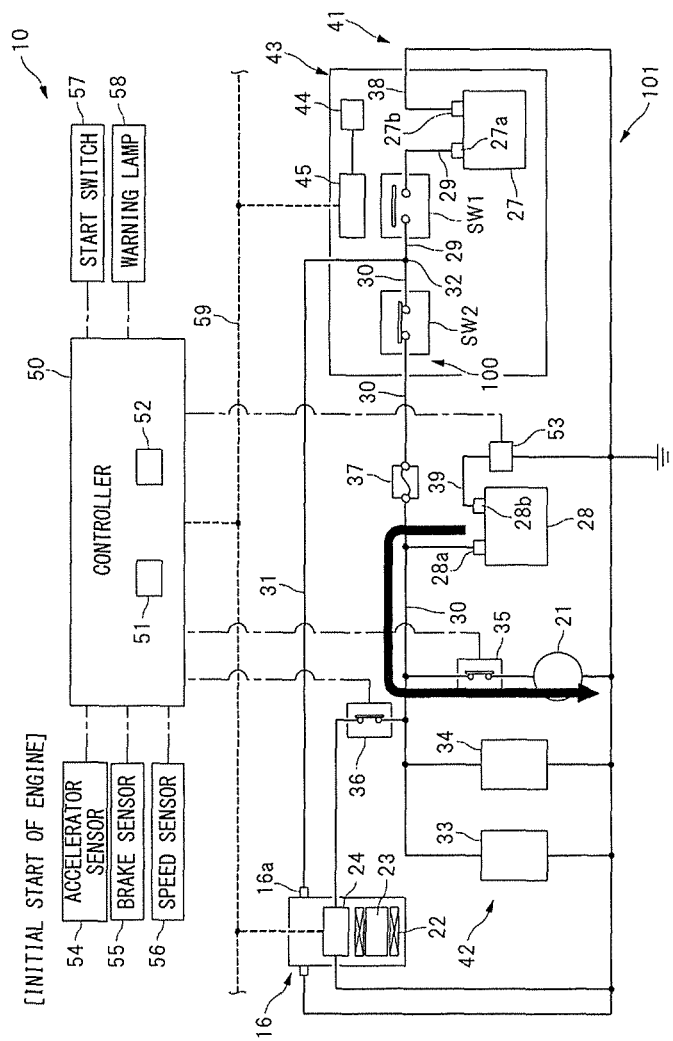
FIG. 8 illustrates a state of power supply of the vehicle power source.
Figure 9:
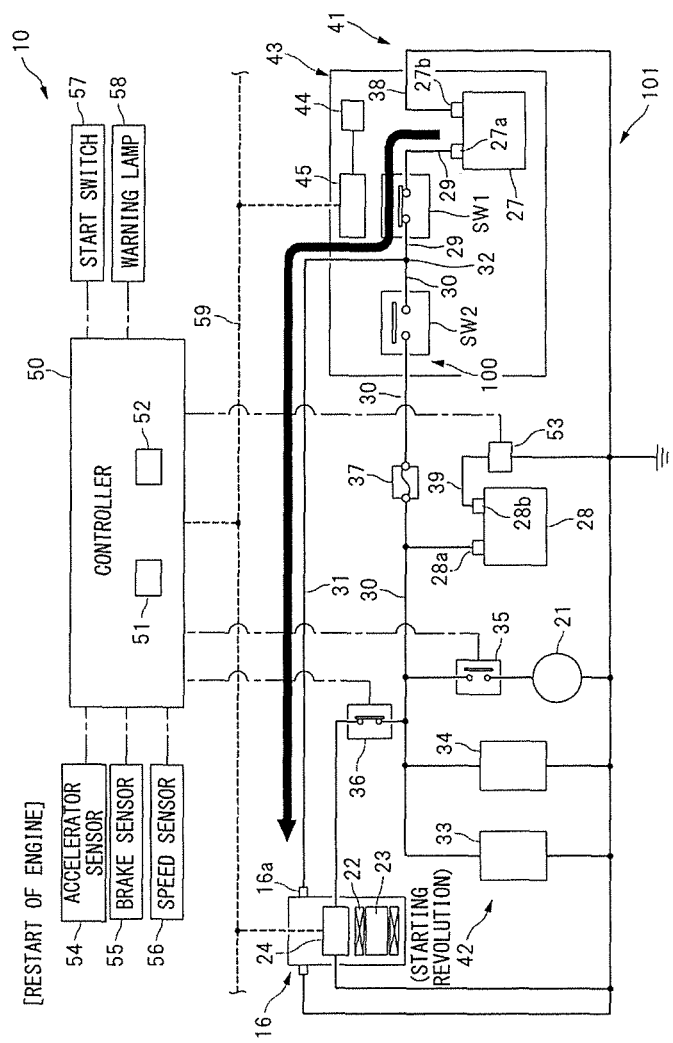
FIG. 9 illustrates a state of power supply of the vehicle power source.

Description is given next of the power supply states of the vehicle power source 10 at engine start. FIGS. 8 and 9 illustrate the power supply states of the vehicle power source 10. FIG. 8 illustrates the power supply state at initial start of the engine by operation of the start switch. FIG. 9 illustrates the power supply state at engine restart by idling stop control.

Referring to FIG. 8, at the initial start of the engine by the operation of the start switch by a driver, the ON/OFF switch SW2 in the battery module 43 may be closed, and thereafter the starter relay 35 may be closed. This may cause power supply from the lead battery 28 to the starter motor 21, allowing the engine 12 to be started by cranking operation of the starter motor 21. Note that the ON/OFF switch SW1 in the battery module 43 may be closed after the engine 12 is started. In the forgoing description, the ON/OFF switch SW1 may be opened in view of suppression of discharge of the lithium ion battery 27. However, this is non-limiting. For example, under a low temperature environment such as, but not limited to, a cold district, the ON/OFF switches SW1 and SW2 may be closed to allow the starter motor 21 to be supplied with power from both the lead battery 28 and the lithium ion battery 27.

Referring to FIG. 9, at the engine restart by the idling stop control, the ON/OFF switch SW2 in the battery module 43 may be opened, and thereafter a target drive torque of the motor generator 16 may be raised. This may cause power supply from the lithium ion battery 27 to the motor generator 16, allowing the engine 12 to be started by the cranking operation of the motor generator 16. In one implementation of the technology, the motor generator 16 may serve as a "starter". At the engine restart by the idling stop control, the ON/OFF switch SW2 may be opened to electrically separate the first power circuit 41 from the second power circuit 42. This makes it possible to prevent an instantaneous voltage drop of the second power circuit 42 with respect to the instantaneous voltage drop protection load 33. Hence, it is possible to keep the instantaneous voltage drop protection load 33 in operation during the engine restart, leading to enhanced vehicle quality.

[Another Implementation]

Figure 10:
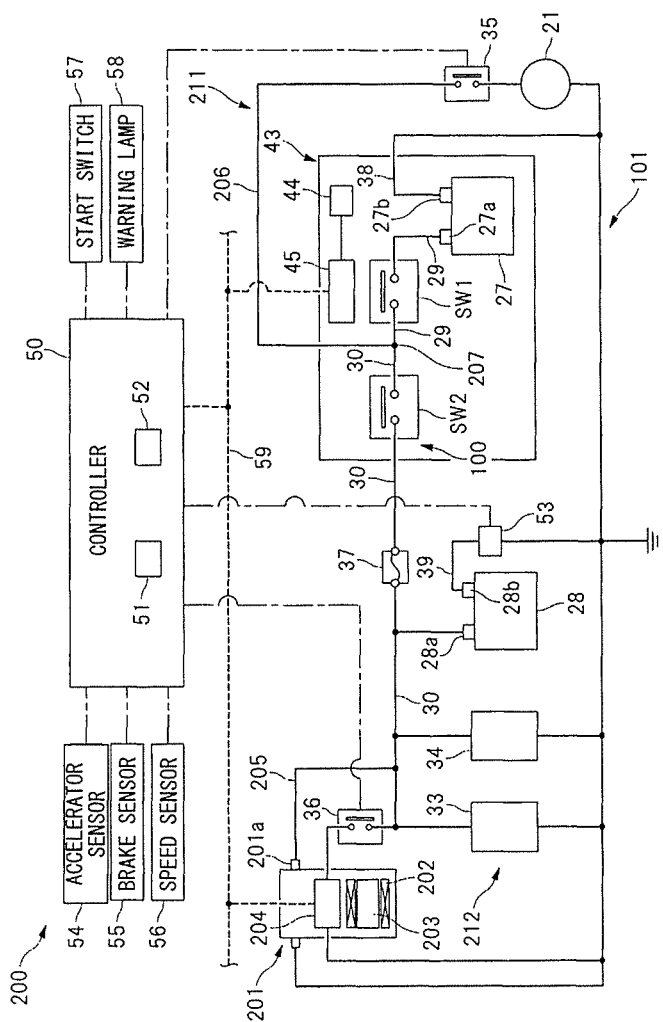
FIG. 10 is a circuit diagram of a configuration of a vehicle power source according to another implementation of the technology.

In the following, description is given of another implementation of the technology. FIG. 10 is a circuit diagram of a configuration of a vehicle power source 200 according to another implementation of the technology. Note that, in FIG. 10, like components and members are identified by the same reference numerals as in FIG. 2, and description thereof is omitted.

The vehicle power source 200 includes an alternator 201. In one implementation of the technology, the alternator 201 may serve as a "generator". The alternator 201 is mechanically coupled to the crank shaft 14 of the engine 12, similarly to the motor generator 16 as described above. The alternator 201 may include a stator 202 and a rotor 203. The stator 202 may include a stator coil. The rotor 203 may include a field coil. The alternator 201 may also include a power generation controller 204, in order to control energized states of the stator coil and the field coil. The power generation controller 204 may include an inverter, a regulator, a microcomputer, and other parts. The use of the power generation controller 204 to control the energized states of the field coil and the stator coil makes it possible to control a generated voltage and a generated current of the alternator 201.

The lithium ion battery 27 is coupled to the alternator 201. The lead battery 28 is coupled, in parallel with the lithium ion battery 27, to the alternator 201. The first power line 29 may be coupled to the positive electrode terminal 27a of the lithium ion battery 27. The second power line 30 may be coupled to the positive electrode terminal 28a of the lead battery 28. The ON/OFF switch SW1 may be inserted in the first power line 29. The ON/OFF switch SW2 may be inserted in the second power line 30. Moreover, the alternator 201 may include an output terminal 201a. A conduction line 205 may be coupled to the output terminal 201a. A conduction line 206 may be coupled to the starter motor 21 through the starter relay 35. The conduction line 205 may extend from the alternator 201 and may be coupled to the second conduction line 30. The first conduction line 29, the second conduction line 30, and the conduction line 206 may be coupled to one another through a node 207.

The vehicle power source 200 may include a first power circuit 211 that includes the lithium ion battery 27 and the starter motor 21. The vehicle power source 200 may also include a second power circuit 212 that includes components such as, but not limited to, the lead battery 28, the instantaneous voltage drop protection load 33, and the vehicle body load 34. The first power circuit 211 and the second power circuit 212 may be coupled to each other through the ON/OFF switch SW2. In one implementation of the technology, the ON/OFF switch SW2 may serve as a "switch". In other words, the ON/OFF switch SW2 is switched between a conductive state and a cut-off state; the conduction state may involve electrical coupling of the first power circuit 211 to the second power circuit 212; and the cut-off state may involve electrical separation of the first power circuit 211 from the second power circuit 212. Note that, in the illustrated example, the ON/OFF switch SW1 may be inserted in the first power line 29, but this is non-limiting. The ON/OFF switch SW1 may be inserted in a conduction line 28 on negative electrode side.

With the vehicle power source 200 having such a circuit configuration, similar functioning may be attained to that of the vehicle power source 10 as described. Specifically, with the ON/OFF switches SW1 and SW2 kept in the closed state, the generated voltage of the alternator 201 is raised above the terminal voltage V1 of the lithium ion battery 27, causing the generated power of the alternator 201 to be supplied to the lithium ion battery 27, the lead battery 28, the instantaneous voltage drop protection load 33, and the vehicle body load 34. The generated voltage of the alternator 201 is lowered below the terminal voltage V1 of the lithium ion battery 27, causing the power stored in the lithium ion battery 27 to be supplied to the instantaneous voltage drop protection load 33, the vehicle body load 34, and the lead battery 28. Thus, controlling the generated voltage of the alternator 201 makes it possible to control charge and discharge of the lithium ion battery 27 while keeping the ON/OFF switches SW1 and SW2 in the closed state.

Moreover, similarly to the vehicle power source 10 as described, at the initial start of the engine by the operation of the start switch by a driver, the ON/OFF switch SW2 may be closed, and thereafter the starter relay 35 may be closed. This may cause power supply from the lead battery 28 to the starter motor 21, allowing the engine 12 to be started by the cranking operation of the starter motor 21. Note that the ON/OFF switch SW1 may be closed after the engine 12 is started. At the engine restart by the idling stop control, the ON/OFF switch SW2 may be opened, and thereafter the starter relay 35 may be closed. This may cause power supply from the lithium ion battery 27 to the starter motor 21, allowing the engine 12 to be started by the cranking operation of the starter motor 21. In one implementation of the technology, the starter motor 21 may serve as a "starter". At the engine restart by the idling stop control, the ON/OFF switch SW2 may be opened to electrically separate the first power circuit 211 from the second power circuit 212. This makes it possible to prevent an instantaneous voltage drop of the second power circuit 212 with respect to the instantaneous voltage drop protection load 33. Hence, it is possible to keep the instantaneous voltage drop protection load 33 in operation during the engine restart, leading to enhanced vehicle quality.

The technology is by no means limited to the implementations described above, and may be modified in variety of ways without departing from the scope of the subject matter of the technology. As described, the lithium ion battery 27 may be adopted as the "first power storage", and the lead battery 28 may be adopted as the "second power storage". In combined use of the lithium ion battery 27 and the lead battery 28, an iron phosphate lithium ion battery may be adopted for the lithium ion battery 27. The iron phosphate lithium ion battery includes iron phosphate lithium as a positive electrode material. However, the "first power storage" and the "second power storage" are not limited to the lithium ion battery 27 and the lead battery 28; any power storage may be also adopted. For example, a lead battery, a nickel hydrogen battery, an electric double layered capacitor, and other batteries or capacitors may be adopted as the "first power storage". A lithium ion battery, a nickel hydrogen battery, an electric double layered capacitor, and other batteries or capacitors may be adopted as the "second power storage". Note that a same kind of power storages that are different in terminal voltages or internal resistance may be adopted as the "first power storage" and the "second power storage".

The forgoing description involves using the motor generator 16 that may serve as a generator and an electric motor. However, this is non-limiting. A generator that does not serve as an electric motor may be also used. Even in this case, controlling the generated voltage of the generator makes it possible to control charge and discharge of the "first power storage". Note that the motor generator 16 is not limited to an induction generator, and generators of other forms may also be adopted.

In the forgoing description, the ON/OFF switch SW2 may be inserted in the second power line 30 that constitutes the conduction path 100. However, this is non-limiting. The ON/OFF switch SW2 may be inserted in the conduction line 39 that constitutes the conduction path 101. With the ON/OFF switch SW2 thus inserted in the conduction path 101, it is also possible to control a coupling state of the lead battery 28 to the power circuits. Moreover, the ON/OFF switches SW1 and SW2 provided in the vehicle power source 10 may be an electromagnetic switch that allows a contact to operate by an electromagnetic force, or a semiconductor switch that includes a semiconductor element.

In the forgoing description, the control unit 50 as one unit may include the charge and discharge controller 51 and the ISS controller 52. However, this is non-limiting. For example, one control unit that incorporates the charge and discharge controller 51 may be provided separately from another control unit that incorporates the ISS controller 52. Moreover, the vehicle 11 on which the vehicle power source 10 is mounted is not limited to a vehicle having a function of the idling stop control, but may be a vehicle that does not have the function of the idling stop control. Furthermore, in the forgoing description, the vehicle body load 34 may be coupled to the first power circuit 41. However, this is non-limiting. The vehicle body load 34 may be coupled solely to the second power circuit 42, or may be coupled to both the first power circuit 41 and the second power circuit 42.

In the forgoing description, in controlling the motor generator 16 to the combustion power generation state, the generated voltage VG may be raised to the predetermined voltage Va; in controlling the motor generator 16 to the regenerative power generation state, the generated voltage VG may be raised to the predetermined voltage Vb. However, this is non-limiting. For example, the target generated voltage of the motor generator 16 in the combustion power generation state may coincide with the target generated voltage of the motor generator 16 in the regenerative power generation state. Moreover, in the combustion power generation state and the regenerative power generation state, the target generated voltage of the motor generator 16 may vary based on a vehicle speed, the amount of operation of the accelerator pedal, and the amount of operation of the brake pedal. Furthermore, in the forgoing description, at the engine restart in the idling stop control, the motor generator 16 may be driven as an electric motor. However, this is non-limiting. For example, in acceleration traveling after the engine start, the motor generator 16 may be driven as an electric motor, allowing for reduction in a load on the engine 12.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle power source mounted on a vehicle, the vehicle power source comprising:
   a generator coupled to an engine;
   a first power storage coupled to the generator;
   a second power storage coupled, in parallel with the first power storage, to the generator, a terminal voltage of the second power storage being set lower than a terminal voltage of the first power storage; and
   a charge and discharge controller that controls a voltage generated by the generator and controls charge and discharge of the first power storage, wherein
      a lower limit voltage of a charge and discharge range of the first power storage is set higher than an upper limit voltage of a charge and discharge range of the second power storage,
      the lower limit voltage and the upper limit voltage correspond to battery voltages of when no current is flowing through the first power storage and the second power storage,
      the charge and discharge controller raises the voltage generated by the generator to a voltage higher than the terminal voltage of the first power storage, to cause power supply from the generator to the first power storage, and
      the charge and discharge controller lowers the voltage generated by the generator to a voltage lower than the terminal voltage of the first power storage, to cause power supply from the first power storage to an electric load.

2. The vehicle power source according to claim 1, wherein the first power storage has internal resistance lower than internal resistance of the second power storage.

3. The vehicle power source according to claim 1, further comprising:
   a first power circuit including the first power storage;
   a second power circuit including the second power storage and the electric load; and
   a switch that couples the first power circuit to the second power circuit, wherein
      the charge and discharge controller raises, while the switch is in a closed state, the voltage generated by the generator to a voltage higher than the terminal voltage of the first power storage, to cause power supply from the generator to the first power storage, and
      the charge and discharge controller lowers, while the switch is in a closed state, the voltage generated by the generator to a voltage lower than the terminal voltage of the first power storage, to cause power supply from the first power storage to the electric load.

4. The vehicle power source according to claim 2, further comprising:
   a first power circuit including the first power storage;
   a second power circuit including the second power storage and the electric load; and
   a switch that couples the first power circuit to the second power circuit, wherein
      the charge and discharge controller raises, while the switch is in a closed state, the voltage generated by the generator to a voltage higher than the terminal voltage of the first power storage, to cause power supply from the generator to the first power storage, and
      the charge and discharge controller lowers, while the switch is in a closed state, the voltage generated by the generator to a voltage lower than the terminal voltage of the first power storage, to cause power supply from the first power storage to the electric load.

5. The vehicle power source according to claim 3, further comprising an engine controller that automatically stops the engine based on a stop condition and automatically restarts the engine based on a start condition, wherein
   the electric load is an electrical appliance that is in operation during engine restart by the engine controller, and
   the engine controller drives a starter while the switch is in an open state, to restart the engine.

6. The vehicle power source according to claim 4, further comprising an engine controller that automatically stops the engine based on a stop condition and automatically restarts the engine based on a start condition, wherein
   the electric load is an electrical appliance that is in operation during engine restart by the engine controller, and
   the engine controller drives a starter while the switch is in an open state, to restart the engine.

7. The vehicle power source according to claim 5, wherein the generator is the starter that causes starting revolution of the engine.

8. The vehicle power source according to claim 6, wherein the generator is the starter that causes starting revolution of the engine.

9. The vehicle power source according to claim 3, further comprising a conduction path, wherein
   the first power storage includes a positive electrode terminal,
   the second power storage includes a positive electrode terminal,
   the conduction path couples the positive electrode terminal of the first power storage to the positive electrode terminal of the second power storage, and
   the switch is inserted in the conduction path.

10. The vehicle power source according to claim 4, further comprising a conduction path, wherein
   the first power storage includes a positive electrode terminal,
   the second power storage includes a positive electrode terminal,
   the conduction path couples the positive electrode terminal of the first power storage to the positive electrode terminal of the second power storage, and
   the switch is inserted in the conduction path.

* * * * *